United States Patent
Chen et al.

(10) Patent No.: US 10,389,726 B2
(45) Date of Patent: Aug. 20, 2019

(54) SERVICE PROCESSING METHOD, APPARATUS AND SERVER

(71) Applicant: ALIBABA GROUP HOLDING LIMITED, Grand Cayman (KY)

(72) Inventors: Lijun Chen, Hangzhou (CN); Lingling Ye, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 194 days.

(21) Appl. No.: 15/505,400

(22) PCT Filed: Aug. 11, 2015

(86) PCT No.: PCT/CN2015/086613
§ 371 (c)(1),
(2) Date: Feb. 21, 2017

(87) PCT Pub. No.: WO2016/026399
PCT Pub. Date: Feb. 25, 2016

(65) Prior Publication Data
US 2017/0272447 A1    Sep. 21, 2017

(30) Foreign Application Priority Data
Aug. 21, 2014    (CN) .......................... 2014 1 0416166

(51) Int. Cl.
*H04L 29/06*    (2006.01)
*G06Q 20/02*    (2012.01)
(Continued)

(52) U.S. Cl.
CPC ........... *H04L 63/102* (2013.01); *G06Q 20/02* (2013.01); *H04L 29/08* (2013.01); *H04L 63/083* (2013.01); *G06Q 20/405* (2013.01)

(58) Field of Classification Search
CPC ..... H04L 63/102; H04L 63/083; H04L 29/08; G06Q 20/02; G06Q 20/405
See application file for complete search history.

(56) References Cited

U.S. PATENT DOCUMENTS

| | | | |
|---|---|---|---|
| 6,714,791 B2 | 3/2004 | Friedman |
| 7,204,412 B2 | 4/2007 | Foss |

(Continued)

FOREIGN PATENT DOCUMENTS

| | | |
|---|---|---|
| CN | 101093567 A | 12/2007 |
| CN | 101226616 A | 7/2008 |

(Continued)

OTHER PUBLICATIONS

International Preliminary Report on Patentability Chapter I for Application No. PCT/CN2015/086613, dated Feb. 21, 2017, 11 pages.

(Continued)

*Primary Examiner* — Matthew Smithers

(57) ABSTRACT

The present application provides a service processing method, apparatus and server, and the method includes: when a first user logs on a client device based on a first account, receiving an operation request for requesting a service operation from the first user; according to the first account, searching account binding relationship which has been stored; if a second account of a second user bound with the first account is found, permitting the first user to accomplish the service operation using the second account authority of the second account; after the first user accomplishes the service operation using the second account authority of the second account, updating the second account information of the second account according to the operation result of the service operation. By applying the embodiments of the present application, the first user can accomplish various service operations on the basis of the account authorities of (Continued)

the multiple bound accounts, thus expanding the way of implementing services; and the times of transmission of service data among different accounts can be reduced, thus improving the interactive efficiency of service information.

15 Claims, 7 Drawing Sheets

(51) Int. Cl.
*H04L 29/08* (2006.01)
*G06Q 20/40* (2012.01)

(56) References Cited

U.S. PATENT DOCUMENTS

| | | | |
|---|---|---|---|
| 8,121,945 | B2 | 2/2012 | Rackley et al. |
| 8,326,769 | B1 | 12/2012 | Weisman |
| 8,662,384 | B2 | 3/2014 | Dodin |
| 8,666,834 | B2 | 3/2014 | Kamimaeda et al. |
| 9,665,864 | B2 | 5/2017 | Prakash et al. |
| 9,864,991 | B2 | 1/2018 | Beasley et al. |
| 2004/0015702 | A1 | 1/2004 | Mercredi et al. |
| 2007/0011104 | A1 | 1/2007 | Leger et al. |
| 2008/0250026 | A1 | 10/2008 | Linden et al. |
| 2008/0277465 | A1 | 11/2008 | Pletz et al. |
| 2010/0138344 | A1 | 6/2010 | Wong et al. |
| 2011/0093520 | A1 | 4/2011 | Doyle et al. |
| 2011/0131077 | A1 | 6/2011 | Tan |
| 2011/0289004 | A1 | 11/2011 | Prakash et al. |
| 2011/0320347 | A1 | 12/2011 | Tumminaro et al. |
| 2012/0197754 | A1 | 8/2012 | Kalin |
| 2012/0197794 | A1 | 8/2012 | Grigg et al. |
| 2012/0221420 | A1 | 8/2012 | Ross |
| 2012/0254021 | A1 | 10/2012 | Wohied et al. |
| 2013/0159173 | A1 | 6/2013 | Sivaraman |
| 2014/0129959 | A1 | 5/2014 | Battles et al. |
| 2015/0073994 | A1 | 3/2015 | Nagayama |
| 2015/0134116 | A1* | 5/2015 | Li .................... H04L 51/32 700/275 |
| 2015/0142658 | A1* | 5/2015 | Li .................... G06Q 20/401 705/44 |
| 2015/0215261 | A1* | 7/2015 | Zhang ............... G06Q 10/10 709/206 |
| 2015/0237029 | A1* | 8/2015 | Zhang ............... H04L 63/08 726/6 |
| 2016/0098791 | A1* | 4/2016 | Huang ............... G06Q 20/32 705/35 |
| 2016/0345166 | A1* | 11/2016 | Hou .................. H04L 63/08 |
| 2017/0026316 | A1* | 1/2017 | Li ..................... H04W 4/12 |

FOREIGN PATENT DOCUMENTS

| | | |
|---|---|---|
| CN | 102254259 A | 11/2011 |
| CN | 102289754 A | 12/2011 |
| CN | 102831518 A | 12/2012 |
| CN | 103530766 A | 1/2014 |
| JP | 2006-239500 A | 10/2006 |
| JP | 2006-283500 A | 10/2006 |
| JP | 2006293500 A | 10/2006 |
| JP | 2008-129860 A | 6/2008 |
| JP | 2009-163706 A | 7/2009 |
| JP | 2012-003349 A | 1/2012 |
| JP | 2012-003359 A | 1/2012 |

OTHER PUBLICATIONS

First Search Report for Chinese Application No. 201410416166.1, dated Feb. 24, 2018, 1 page.
First Office Action for Chinese Application No. 201410416166.1, dated Mar. 5, 2018, 8 pages.
International Search Report and Written Opinion for Application No. PCT/CN2015/086613, dated Nov. 11, 2015, 11 pages.
Final Office Action dated Sep. 4, 2018, issued in related Japanese Application No. 2017-510299 (3 pages).
First Office Action dated Aug. 20, 2018, issued in related Korean Application No. 10-2017-7004748 (5 pages).
Hayes, J., "Policy-based Authentication and Authorization: Secure Access to the Network Infrastructure," Computer Security Applications, Dec. 11, 2000, 16th Annual Conference New Orleans, XP010529830, p. 328-333.
European Search Report for Application No. 15834266.7, dated Dec. 4, 2017, 8 pages.
Office Action for Japanese Application No. 2017-510299, dated May 22, 2018, 5 pages.
Decision of a patent grant for Japan Patent Application No. 2017-510299, dated Oct. 30, 2018, 1 page.

* cited by examiner

SERVICE PROCESSING METHOD, APPARATUS AND SERVER

CROSS-REFERENCE TO RELATED APPLICATIONS

This application is a national phase application of International Application No. PCT/CN2015/086613, filed on Aug. 11, 2015, which claims priority to and benefits of Chinese Patent Application No. 201410416166.1, filed on Aug. 21, 2014. The contents of the above-referenced applications are incorporated herein by reference in their entirety.

TECHNICAL FIELD

The present application relates to the field of communication technologies, and in particular, to a service processing method, apparatus and server.

BACKGROUND ART

With the development of smart terminals and the popularity of network applications, a user can implement various service operations, such as social instant messaging services and shopping payment services, using various application clients installed on a terminal. To implement the above services, a terminal user usually needs to register a service account on a server, and implement certain service operations based on the service account.

However, in the prior art, the terminal user can only accomplish various service operations based on his/her own account. Therefore, the way of implementing services is relatively simple, and the interactive efficiency of service information is low.

SUMMARY

The present application provides a service processing method, apparatus and server, to solve the problems in the prior art that the way of implementing services is relatively simple and the interactive efficiency of service information is low.

According to a first aspect of embodiments of the present application, a service processing method applied to a service processing server is provided, the method including:

when a first user logs on a client device based on a first account, receiving an operation request for requesting a service operation from the first user;

according to the first account, searching account binding relationship which has been stored;

if a second account of a second user bound with the first account is found, permitting the first user to accomplish the service operation by the second account authority of the second account; and after the first user accomplishes the service operation by the second account authority, updating the second account information of the second account according to the operation result of the service operation.

According to a second aspect of the embodiments of the present application, a service processing apparatus applied to a service processing server is provided, the apparatus including:

a receiving unit, configured to, when a first user logs on a client device based on a first account, receive an operation request for requesting a service operation from the first user;

a searching unit, configured to, according to the first account, search account binding relationship which has been stored;

a control unit, configured to, if a second account of a second user bound with the first account is found, permit the first user to accomplish the service operation by the second account authority of the second account; and an update unit, configured to, after the first user accomplishes the service operation by the second account authority, update the second account information of the second account according to the operation result of the service operation.

According to a third aspect of the embodiments of the present application, a server is provided, including:

a processor; and a memory configured to store executable instructions of the processor;

wherein the processor is configured to:

when a first user logs on a client device based on a first account, receive an operation request for requesting a service operation from the first user;

according to the first account, search account binding relationship which has been stored;

if a second account of a second user bound with the first account is found, permit the first user to accomplish the service operation by the second account authority of the second account; and after the first user accomplishes the service operation by the second account authority, update the second account information of the second account according to the operation result of the service operation.

By use of the technical solutions provided in the embodiments of the present application, when a first user logs based on a first account, an application server, if finding a binding relationship between the first account and a second account in an account binding relationship, permits the first user to accomplish service operation using the second account authority of a second user, and directly updates second account information of the second account after the service operation is accomplished. By use of the embodiments of the present application, the second user can authorize the first user having an intimate relationship with the second user to use the second account authority of the second user, such that the first user can accomplish various service operations on the basis of the account authorities of multiple bound accounts, thus expanding the way of implementing services. Moreover, as the second account information is directly updated after a service operation is accomplished, the times of transmission of service data among different accounts can be reduced, thus improving the interactive efficiency of service information.

It should be understood that the general description above and the detailed description hereinafter are merely exemplary and explanatory, but cannot limit the present application.

BRIEF DESCRIPTION OF THE DRAWINGS

The accompanying drawings herein are incorporated into the specification and constitute a part of the specification, illustrate embodiments in line with the present application, and are used for explaining the principle of the present application together with the specification.

DETAILED DESCRIPTION

Exemplary embodiments will be described in detail here, which are illustrated in the accompanying drawings. When the accompanying drawings are involved in the following description, unless otherwise indicated, the same numbers in different accompanying drawings represent the same or similar elements. Implementations described in the following exemplary embodiments do not represent all the implementations consistent with the present application. On the contrary, they are merely examples of apparatuses and methods consistent with some aspects of the present application as detailed in the appended claims.

The terms used in the present application are merely for the purpose of describing specific embodiments, instead of being aimed to limit the present application. The singular forms "one", "said" and "the" used in the present application and the appended claims are also intended to include plural forms, unless other meanings are clearly indicated in the context. It should also be understood that the term "and/or" used herein refers to and includes any or all possible combinations of one or more associated listed items.

It should be understood that, although the present application may use the terms such as first, second and third to describe various kinds of information, the information should not be limited to the terms. The terms are only used to distinguish the same type of information from each other. For example, without departing from the scope of the present application, first information may also be referred to as second information, and similarly, the second information may also be referred to as the first information. Depending upon the context, the word "if" as used herein may be explained as "while . . . " or "when . . . " or "in response to determining".

Figure 1:
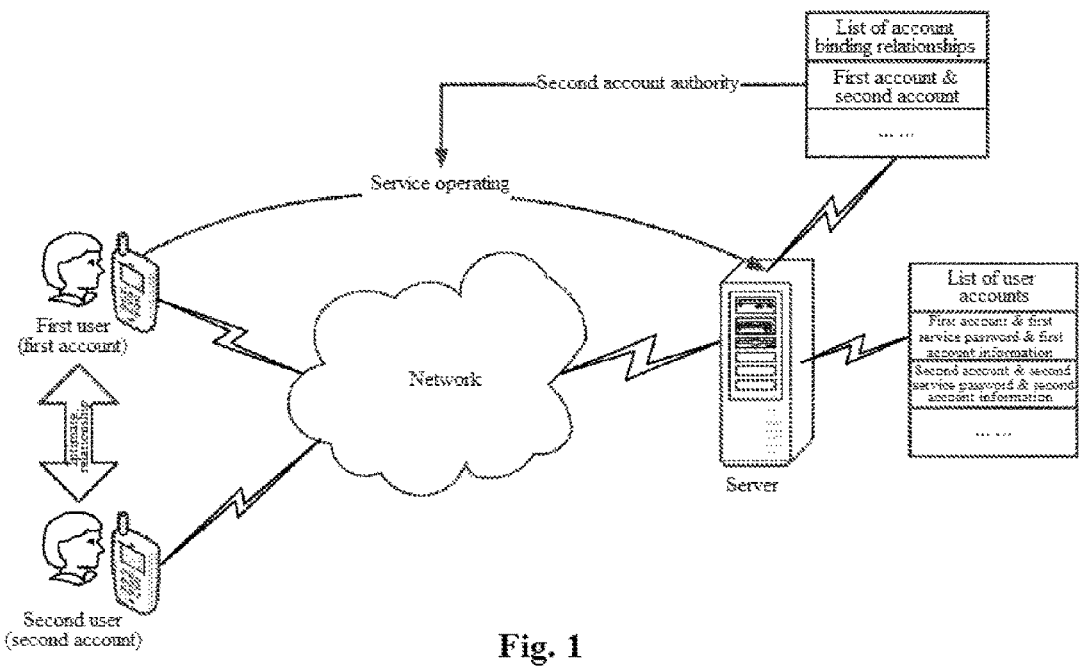
FIG. 1 is a schematic diagram of an application scenario of an embodiment of service processing according to the present application.

Referring to FIG. 1, it is a schematic diagram of an application scenario of an embodiment of service processing according to the present application:

A user illustrated in FIG. 1 is connected to a server via a network. In the present application, the user specifically refers to various client devices having a network connection function, for example, a mobile phone, a tablet computer and the like. Certainly, the embodiment of the present application does not exclude applications on a personal computer (PC). A first user registers a first account on a server, a second user registers a second account on the server, the server stores a correspondence relationship between registered accounts, service passwords and account information by using a list of user accounts, the users can accomplish various service operations by using account authorities of their accounts after logging on the server by using their respective registered accounts, and the server updates account information of the users according to the completion result of a service operation.

In the embodiment of the present application, it is possible to, based on an intimate relationship between users, expand the way of implementing services and improve the interactive efficiency of service information. As shown in FIG. 1, the first user and the second user have an intimate relationship, after the second user authorizes the first user to use the account authority of the second account thereof, the server stores a binding relationship between the first account and the second account. Subsequently, the first user can directly use the account authority of the second account bound therewith to accomplish various service operations, and after a service operation is accomplished, the server directly updates second account information. The embodiment of the present application is described below in detail with reference to FIG. 1.

Figure 2:
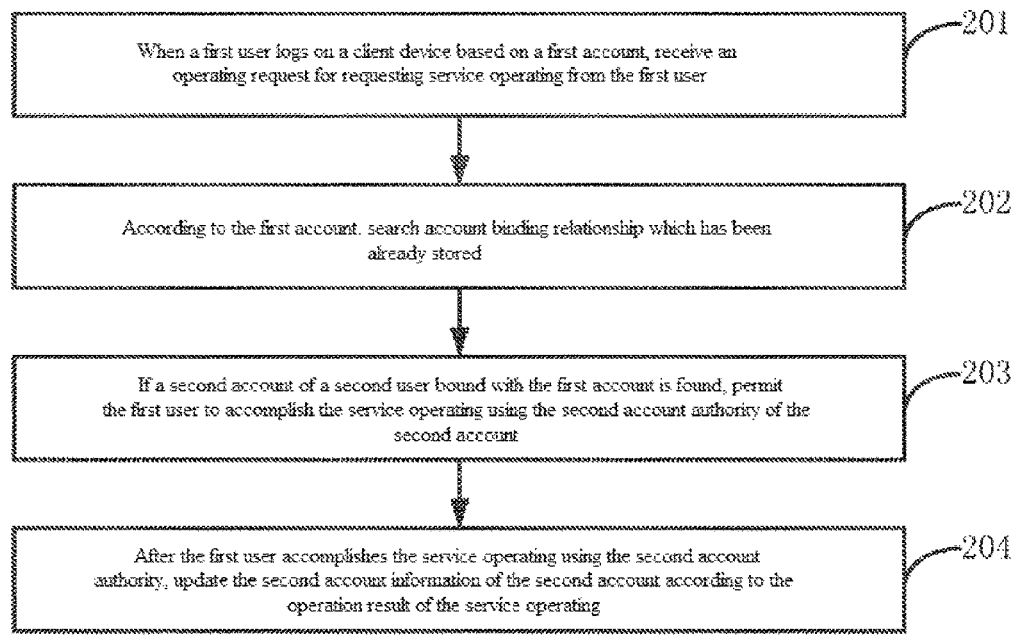
FIG. 2 is a flow chart of an embodiment of a service processing method according to the present application.

Referring to FIG. 2, it is a flow chart of an embodiment of a service processing method according to the present application:

Step 201: When a first user logs on a client device based on a first account, receive an operation request for requesting a service operation from the first user.

In the embodiment of the present application, after registering a first account on a server, the first user can log on the server based on the first account, to accomplish various service operations. The first account is information according to which the server can uniquely identify the first user, including a user name of the first user, for example, the first account is user1@ABC.com, and the second account is "user2@ABC.com"; the service operations mainly refer to various application functions provided by the server for the user, for example, a payment function provided by a third party payment server for the user to accomplish a payment operation on an online shopping item, or a download function provided by an instant messaging server for the user to accomplish a download operation on a multimedia file in a network storage space, and so on.

Step 202: According to the first account, search account binding relationship which has been stored.

In the embodiment of the present application, based on an intimate relationship between users, a binding relationship between several different accounts is pre-stored in a list of account binding relationships of the server. When the first user sends a service operation request to the server, the server can search the list of account binding relationships according to the first account to determine whether there is another account bound with the first account, in order that the first user can accomplish the service operation by using the account authority of the another account.

Step 203: If a second account of a second user bound with the first account is found, permit the first user to accomplish the service operation using the second account authority of the second account.

In the embodiment of the present application, when the server finds a second account bound with the first account in the list of account binding relationships, a list of optional accounts can be output on a current service operation interface of the first user. The list of optional accounts, in addition to including the first account, may also include the second account bound with the first account. If the first user selects the second account from the list of optional accounts to accomplish the service operation and inputs a service password, the server, when verifying that the input service password is consistent with a first service password in the case that the first user registers the first account, releases the first user to accomplish the service operation by using the second authority of the second account.

Step 204: After the first user accomplishes the service operation using the second account authority, update the second account information of the second account according to the operation result of the service operation.

In the embodiment of the present application, as the first user accomplishes the service operation using the second account authority, after the service operation is accomplished, account information of the first account may not change, and the server can directly update the second account information of the second account according to the operation result of the service operation. For example, after the first user accomplishes a certain payment operation by using a payment account of the second account, the server updates the account balance in the payment account. For another example, after the first user downloads a multimedia file from a storage space of the second account by using the account authority of the second account, the server updates a download record of the multimedia file in the storage space of the second account.

In addition, while being compatible with possible service scenarios of various service operations, in order to further improve the security of the service operations and ensure that user information of bound accounts during the service operations may not be stolen by a malicious third party, in the above embodiment, a correspondence relationship between different service scenarios and security attributes of the service operations may be preset, after the server finds the second account of the second user bound with the first account, it is possible to first determine a security attribute of a service scenario corresponding to a current service operation, when the security attribute is secure, the first user can be permitted to accomplish the service operation using the second account authority, and when the security attribute is insecure, the first user can be prohibited from accomplishing the service operation using the second account authority. At this point, the first user can only accomplish the service operation using the first account authority. For example, for a payment operation, when the service scenario thereof is domestic commodity trading, the corresponding security attribute is secure, and when the service scenario thereof is overseas purchasing trading, the corresponding security attribute is insecure.

It is thus clear from the above embodiment that the second user can authorize the first user having an intimate relationship with the second user to use the second account authority of the second user, such that the first user can accomplish various service operations on the basis of the account authorities of multiple bound accounts, thus expanding the way of implementing services. Moreover, as the second account information is directly updated after a service operation is accomplished, the times of transmission of service data among different accounts can be reduced, thus improving the interactive efficiency of service information.

Figure 3A:
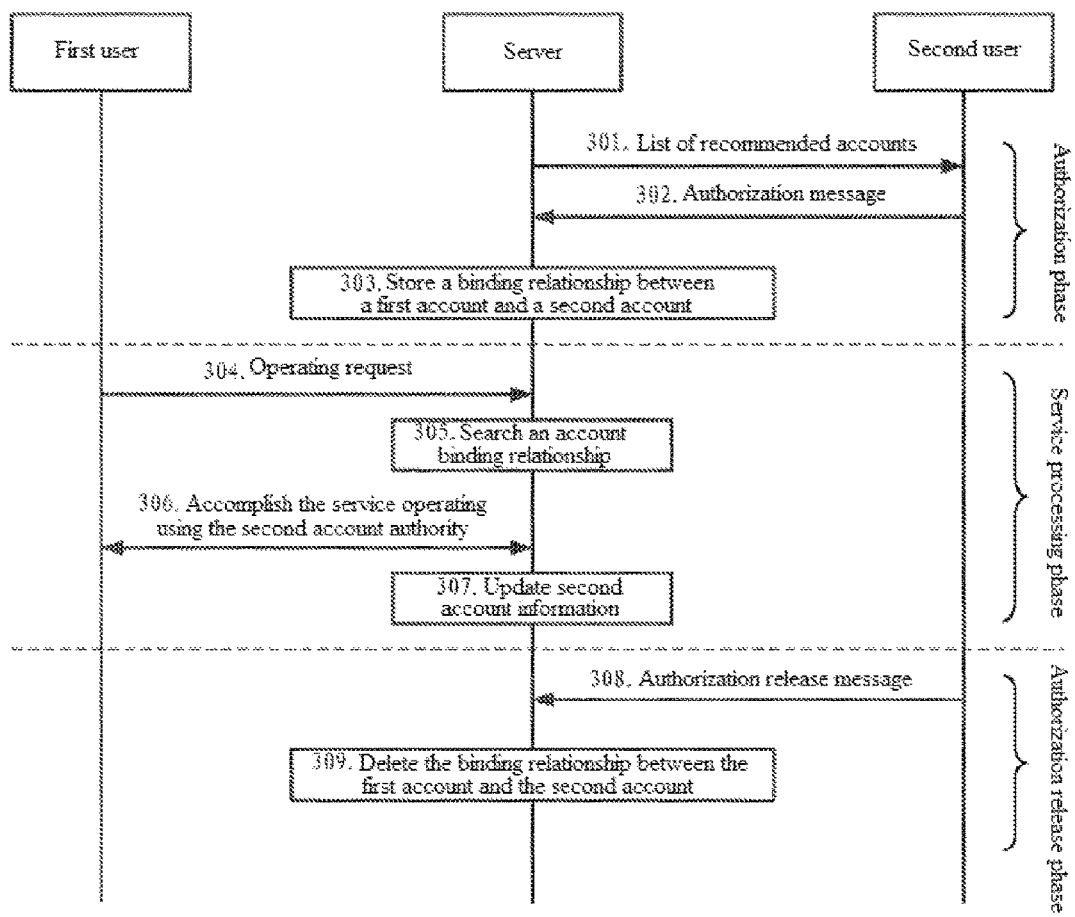
FIG. 3A is a flow chart of another embodiment of the service processing method according to the present application.

Referring to FIG. 3A, it is a flow chart of another embodiment of the service processing method according to the present application. The embodiment illustrates procedures of authorizing account binding and releasing the account binding in detail in combination with the implementation procedure of the service processing:

Step 301: A server sends a list of recommended accounts to a second user, the list of recommended accounts including at least one account of a user whose intimate relationship with the second user has a value exceeding a preset relationship threshold.

In the embodiment of the present application, for each registered user, the server can provide a list of recommended accounts for the user according to intimate relationships between the user and other users, the list of recommended accounts including several accounts that can be authorized to be bound with the user's account.

The server can calculate values of the intimate relationships between the user and other users based on various relationship indexes between the user and other users according to a preset algorithm, and for a user whose intimate relationship with the user has a value greater than a preset relationship threshold, his/her account is added to the list of recommended accounts. For example, if a list of friends of the second user includes several users, the server can calculate values of intimate relationships between the second user and different users according to instant messaging time, the number of instant messaging messages and so on between the second user and different users in the list of friends.

Step 302: The second user sends an authorization message to the server, the authorization message including a first account selected from the list of recommended accounts by the second user, and a set using condition of the second account authority.

Figure 3B:
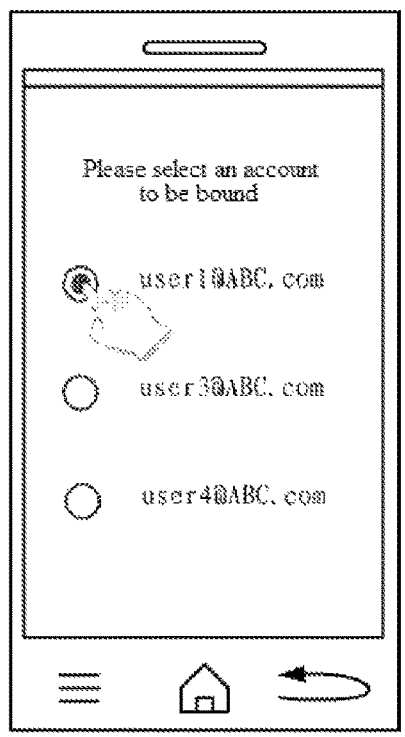
FIG. 3B is a schematic diagram of a selection interface of a list of recommended accounts according to an embodiment of the present application.

After receiving the list of recommended accounts sent by the server, the second user can select one or more accounts authorized to be bound from the list of recommended accounts. In the embodiment of the present application, it is assumed that the second user selects the first account from the list of recommended accounts. As shown in FIG. 3B, it illustrates a schematic diagram of a selection interface of a list of recommended accounts, in which the second user clicks, from the list of recommended accounts, the first account "user1@ABC.com" as an account authorized to be bound.

Further, after selecting the first account authorized to be bound, the second user can set a using condition under which the first account can use the second account authority, for example, for a payment service operation, the using condition of the second account authority may be the upper limit of the amount of the payment operation accomplished using the second account authority; for another example, for an instant messaging service operation, the using condition of the second account authority may be download time, the number of downloads and so on for downloading a multimedia file using the second account authority.

The second user, after selecting the first account and further setting the using condition of the second account authority, can carry the above information in the authorization message to be sent to the server. It should be noted that the second user may not select an account authorized to be bound based on the list of recommended accounts, but directly send an account that he/she wants to authorize to be bound and a using condition of the account authority of the account to the server by an authorization message, which is not limited in the embodiment of the present application.

Step 303: The server stores a binding relationship between the first account and the second account in the account binding relationship according to the authorization message.

In the embodiment of the present application, the server obtains the first account from the received authorization message, and stores a binding relationship between the first account and the second account in the account binding relationship. When the authorization message further carries a using condition, the server can further store the using condition in the above binding relationship.

When the server stores the binding relationship, the following two manners may be employed:

The first manner is as follows: the server can maintain a list of account binding relationships, and each entry in the list is used for storing a binding relationship between accounts, as shown in Table 1 below:

TABLE 1

| Authorized account | Bound account |
|---|---|
| user2@ABC.com | user1@ABC.com |
| ... | ... |
| userX@ABC.com | userY@ABC.com |

The second manner is as follows: the server can maintain a list of account binding relationships separately for each account, each entry of the list is used for storing a binding relationship between one bound account and another authorized account, and Table 2 below illustrates a list of account binding relationships maintained for the first user user1:

TABLE 2

| Bound account | Authorized account |
|---|---|
| user1@ABC.com | user2@ABC.com |
|  | ... |
|  | user123@ABC.com |

Step 304: After a first user logs on a client device based on the first account, the first user sends an operation request for requesting a service operation to the server.

Step 305: The server searches an account binding relationship according to the first account of the first user.

In the embodiment of the present application, the server can query the list of account binding relationships as described in step 303, and in combination with the above Table 1, the server can search a "bound account" field according to the first account "user1@ABC.com", to obtain a second account "user2@ABC.com" included in the "authorized account" corresponding to "user1@ABC.com"; alternatively, in combination with the above Table 2, the server can find a list of account binding relationships maintained for user1 according to the first account "user1@ABC.com", to directly obtain all authorized accounts of the first account user1@ABC.com from the list, including the second account user2@ABC.com.

Step 306: The server, when finding a second account bound with the first account, permits the first user, under the using condition of the second account, to accomplish the service operation using the second account authority of the second account.

When the server finds a second account bound with the first account in the list of account binding relationships, a list of optional accounts can be output on a current service operation interface of the first user. The list of optional accounts, in addition to including the first account, may also include the second account bound with the first account.

Figure 3C:
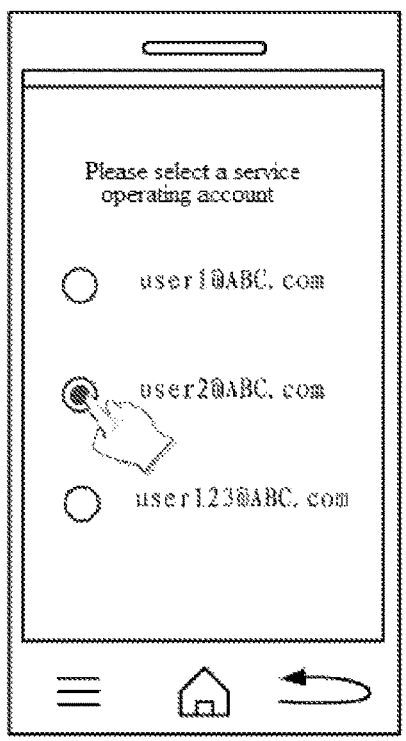
FIG. 3C is a schematic diagram showing that a user selects a service operation account based on a list of optional accounts according to an embodiment of the present application.

If the first user selects the second account from the list of optional accounts to accomplish the service operation and inputs a service password, the server, when verifying that the input service password is consistent with a first service password in the case that the first user registers the first account, releases the first user to accomplish the service operation by using the second authority of the second account. As shown in FIG. 3C, it is a schematic diagram showing that a user selects a service operation account based on a list of optional accounts, in which the first user clicks, from the list of optional accounts, the second account "user2@ABC.com" as an account for accomplishing the service operation.

It should be noted that the first user, in addition to selecting the second account to accomplish the service operation, can also select multiple other accounts from the list of optional accounts to accomplish the service operation at the same time, and the multiple accounts may also include the first account of the first user, which is not limited in the embodiment of the present application. For example, when performing a payment operation, the first user may accomplish the payment operation jointly using the money in a payment account under the first account and the money in a payment account under the second account.

Step 307: After the first user accomplishes the service operation using the second account authority, the server updates second account information of the second account according to the operation result of the service operation.

In the embodiment of the present application, as the first user accomplishes the service operation using the second account authority, after the service operation is accomplished, account information of the first account may not change, and the server can directly update the second account information of the second account according to the operation result of the service operation.

Step 308: The second user sends an authorization release message to the server, the authorization release message including the first account.

It can be known in combination with step 302 that the second user, by sending an authorization message to the server, authorizes the first user to use the second account authority of the second account. Similarly, in this step, the second user may also, by sending an authorization release message to the server, prohibit the first user from using the second account authority of the second account. The authorization release message carries the first account of the first user from which the binding is to be released.

Step 309: The server deletes the binding relationship between the first account and the second account from the account binding relationships according to the authorization release message.

After receiving the authorization release message from the second user, the server can query the list of account binding relationships as described in step 303. In combination with the above Table 1, the server can search the second account "user2@ABC.com" under the authorized account, and when finding "user2@ABC.com" and the authorized account corresponding thereto being the first account "user1@ABC.com", delete the binding relationship between the first account and the second account from Table 1. In combination with the above Table 2, the server can find a list 2 of account binding relationships maintained for user1 according to the first account "user1@ABC.com", and after finding the second account "user2@ABC.com" from the list 2, delete the second account "user2@ABC.com" from the list 2.

It can be seen from the above embodiment that the second user can authorize the first user having an intimate relationship with the second user to use the second account authority of the second user, such that the first user can accomplish various service operations on the basis of the account authorities of the multiple bound accounts, thus expanding the way of implementing services. As the second account information is directly updated after a service operation is accomplished, the times of transmission of service data among different accounts can be reduced, thus improving the interactive efficiency of service information. Moreover, the user can flexibly authorize or release authorizing another user to use the account authority of the user to accomplish the service operation according to requirements, thus ensuring the security of the authorized account while expanding the way of implementing services.

Figure 4:
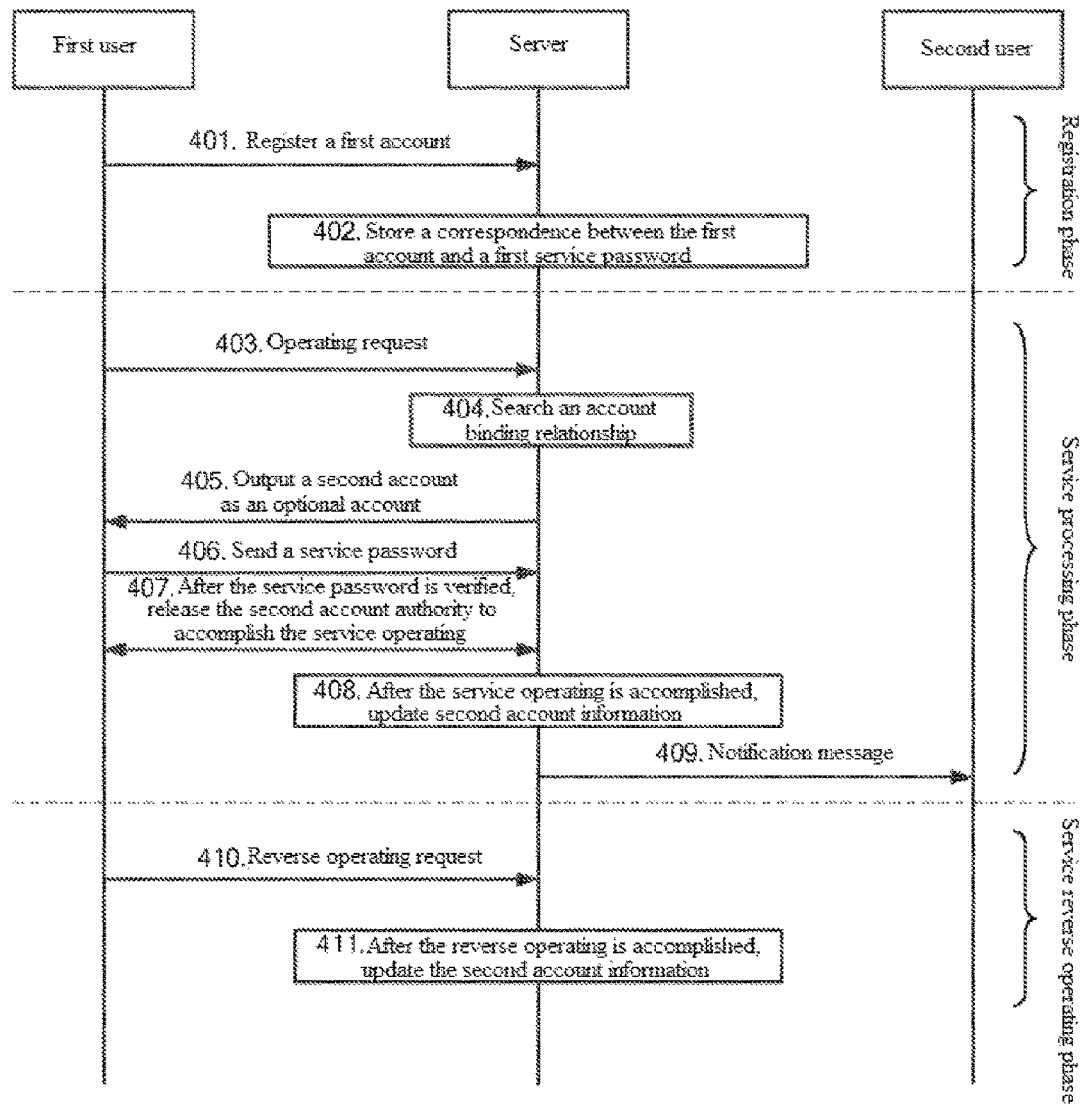
FIG. 4 is a flow chart of another embodiment of the service processing method according to the present application.

Referring to FIG. 4, it is a flow chart of another embodiment of the service processing method according to the present application. The embodiment illustrates update of account information of a bound account and a service reverse operation process in detail in combination with the implementation procedure of the service processing:

Step 401: A first user registers a first account to a server.

Step 402: The server stores a correspondence relationship between the first account and a first service password in a user account.

When a user wants to use various services provided by the server, he/she first needs to register on the server. At this point, the server presents a registration interface to the user, and the user inputs an account name and a service password. It should be noted that the service password in the embodiment of the present application can be consistent with the login password of the user, and can also be a service password dedicated to accomplishing a service operation set independent of the login password, which is not limited in the embodiment of the present application. As the embodiment of the present application focuses on describing the service operation process, merely the service password related to the service operation is described, and the login password may be set together in the registration interface, which is not elaborated in the embodiment of the present application.

In the embodiment of the present application, the server can store, in a list of user accounts, a correspondence relationship between accounts and service passwords when users register, and account information of each account, and the Table 3 below illustrates a list of user accounts including registration information of the first user and the second user:

TABLE 3

| Account | Service password | Account information |
|---|---|---|
| user1@ABC.com | user1abcde | user1***** |
| User2@ABC.com | user2edcba | user2***** |
| ... | ... | ... |

Step 403: When the first user logs on a client device based on the first account, the first user sends an operation request for requesting a service operation to the server.

Step 404: The server, according to the first account, searches account binding relationship which has been stored.

Step 405: The server, when finding a second account bound with the first account, outputs the second account as an optional account on a service operation interface of the first user.

The server, when finding a second account bound with the first account in the list of account binding relationships, can output a list of optional accounts on a current service operation interface of the first user. The list of optional accounts, in addition to including the first account, may also include other accounts bound with the first account, for example, the second account in this embodiment.

Step 406: The first user, after selecting the second account to accomplish the service operation, sends an input service password to the server.

Step 407: The server, when verifying that the input service password is consistent with the first service password stored in the account information, releases the first user to accomplish the service operation using the second account authority.

In this step, the first user, when selecting the second account to accomplish the service operation, can still use the service password when the first user registers, the server finds the account information of the first user from Table 3, and acquires therefrom that the service password of the first account "user1@ABC.com" is "user1abcde", and if the service password input by the first user is the same as "user1abcde", the server releases the second account authority to accomplish the service operation of the first account.

Step 408: After the first user accomplishes the service operation using the second account authority, the server updates second account information of the second account according to the operation result of the service operation.

In the embodiment of the present application, as the first user accomplishes the service operation using the second account authority, after the service operation is accomplished, account information of the first account may not change, and the server can directly update the second account information of the second account according to the operation result of the service operation.

Step 409: The server sends a notification message to the second user, to notify the second user of updated contents of the second account information.

In the embodiment of the present application, the notification message sent by the server to the second user may be a short message sent to a terminal device on which the user registers, or an instant messaging message sent to the second account.

Step 410: The first user sends a reverse operation request for the service operation to the server.

Step 411: After the reverse operation of the service operation is accomplished, the server updates the second account information according to the operation result of the reverse operation.

Suppose that, after the first user accomplishes a payment operation of purchasing a commodity using a payment account of the second account by a third party payment server in step 408, if the commodity has a quality problem, the first user conducts handling of return goods on the commodity, at this point, the first user sends a refunding request to the third party payment server, and the third party payment server directly returns the deducted fund of the commodity to the payment account of the second account, and after the refunding ends, directly updates account balance information in the payment account.

It can be seen from the above embodiment that the second user can authorize the first user having an intimate relationship with the second user to use the second account authority of the second user, such that the first user can accomplish various service operations on the basis of the account authorities of multiple bound accounts, thus expanding the way of implementing services. Moreover, as the second account information is directly updated after the service operation and the reverse service operation are accomplished, the times of transmission of service data among different accounts can be reduced, thus improving the interactive efficiency of service information.

Corresponding to the embodiment of the service processing method described above, the present application further provides an embodiment of a service processing apparatus.

Figure 5:
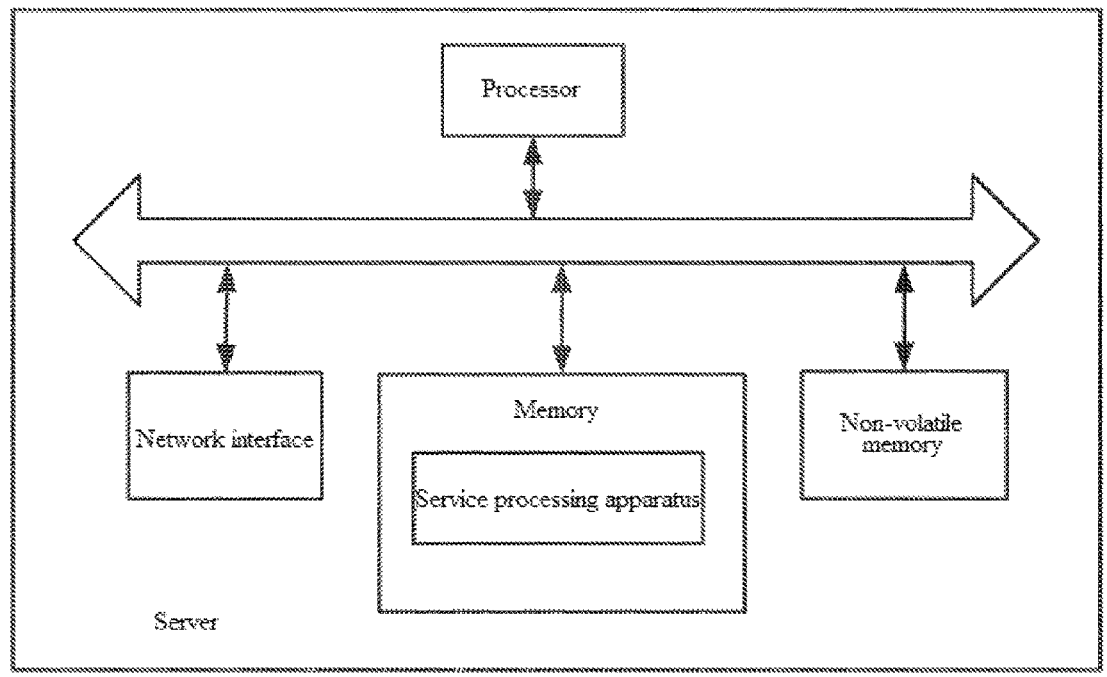
FIG. 5 is a hardware structural diagram of a server where a service processing apparatus is located according to the present application.

The embodiment of the service processing apparatus of the present application can be applied to a server. The apparatus embodiment may be implemented by software, or may be implemented by hardware or a combination of software and hardware. For the implementation by software, as a logical apparatus, it is formed by reading a corresponding computer program instruction in a non-volatile memory into the memory by a processor of a server where the apparatus is located and running the computer program instruction. In terms of the hardware level, as shown in FIG. 5, it is a hardware structural diagram of a server where a service processing apparatus is located according to the present application, in addition to a processor, a memory, a network interface and a non-volatile memory shown in FIG. 5, the server where the apparatus is located in the embodiment may generally also include other hardware according to actual functions of the server, which is not elaborated.

Figure 6:
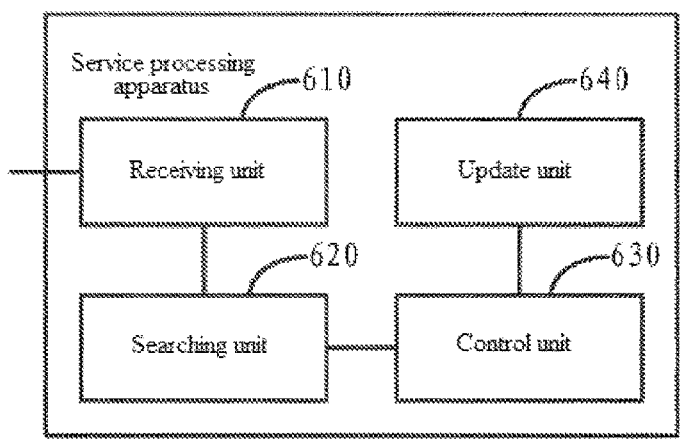
FIG. 6 is a block diagram of an embodiment of the service processing apparatus according to the present application.

Referring to FIG. 6, it is a block diagram of an embodiment of the service processing apparatus according to the present application. The apparatus includes: a receiving unit 610, a searching unit 620, a control unit 630, and an update unit 640.

The receiving unit 610 is configured to, when a first user logs on a client device based on a first account, receive an operation request for requesting a service operation from the first user;

The searching unit 620 is configured to, according to the first account, search account binding relationship which has been stored;

The control unit 630 is configured to, if a second account of a second user bound with the first account is found, permit the first user to accomplish the service operation using the second account authority of the second account;

The update unit 640 is configured to, after the first user accomplishes the service operation using the second account authority, update the second account information of the second account according to the operation result of the service operation.

Figure 7:
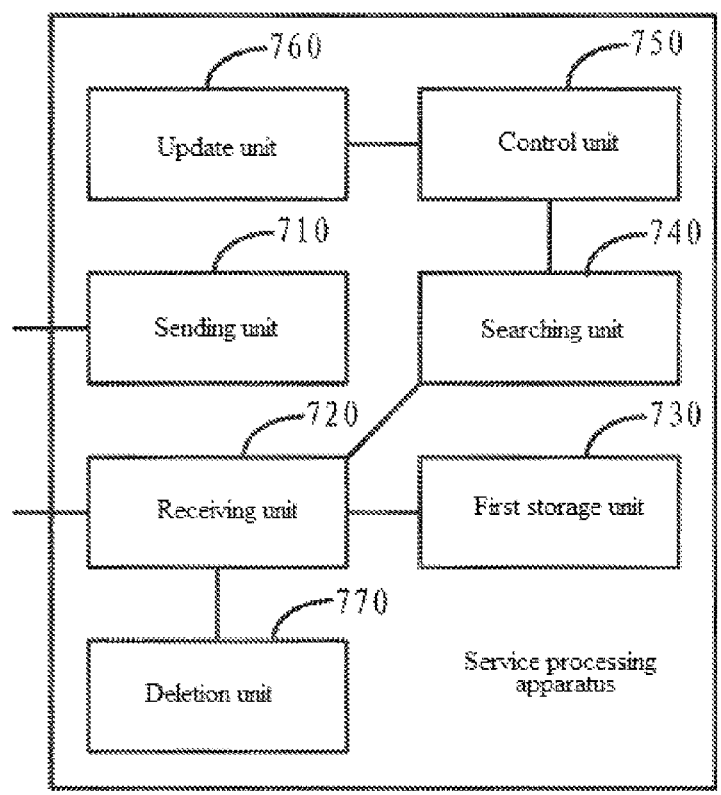
FIG. 7 is a block diagram of another embodiment of the service processing apparatus according to the present application.

Referring to FIG. 7, it is a block diagram of another embodiment of the service processing apparatus according to the present application. The apparatus includes: a sending unit 710, a receiving unit 720, a first storage unit 730, a searching unit 740, a control unit 750, an update unit 760 and a deletion unit 770.

The sending unit 710 is configured to send a list of recommended accounts to a second user, the list of recommended accounts including at least one account of a user whose intimate relationship with the second user has a value exceeding a preset relationship threshold;

The receiving unit 720 is configured to receive an authorization message of the second user, the authorization message including a first account selected from the list of recommended accounts by the second user;

The first storage unit 730 is configured to store a binding relationship between the first account and the second account of the second user in the account binding relationship according to the authorization message;

The receiving unit 720 is further configured to, when the first user logs on a client device based on the first account, receive an operation request for requesting a service operation from the first user;

The searching unit 740 is configured to, according to the first account, search account binding relationship which has been stored;

The control unit 750 is configured to, if a second account bound with the first account is found, permit the first user to accomplish the service operation using the second account authority of the second account;

The update unit 760 is configured to, after the first user accomplishes the service operation using the second account authority, update the second account information of the second account according to the operation result of the service operation;

The receiving unit 720 is further configured to receive an authorization release message sent by the second user, the authorization release message including the first account;

The deletion unit 770 is configured to delete the binding relationship between the first account and the second account from the account binding relationship according to the authorization release message.

In one optional implementation manner:

the authorization message received by the receiving unit 720 may further include a using condition of the second account authority; and the control unit 750 may be specifically configured to permit the first user, under the using condition, to accomplish the service operation using the second account authority of the second account.

Figure 8:
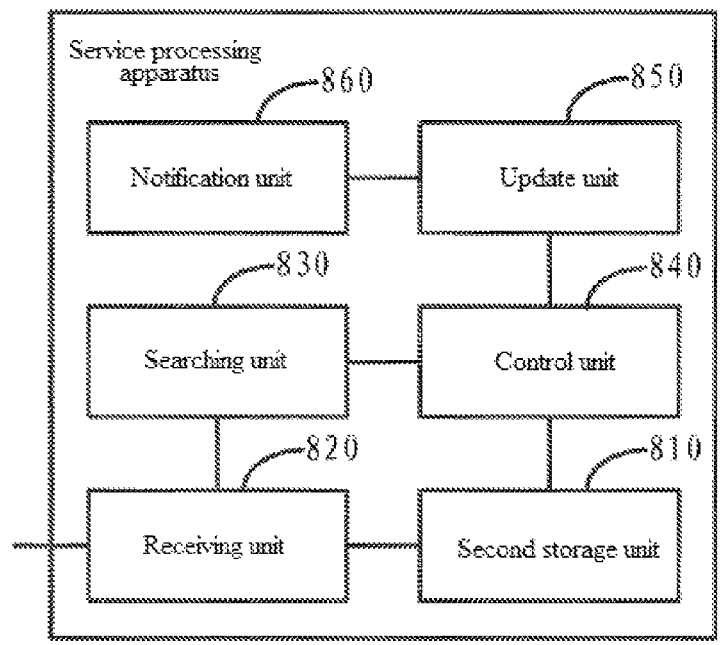
FIG. 8 is a block diagram of another embodiment of the service processing apparatus according to the present application.

Referring to FIG. 8, it is a block diagram of another embodiment of the service processing apparatus according to the present application. The apparatus includes: a second storage unit 810, a receiving unit 820, a searching unit 830, a control unit 840, an update unit 850 and a notification unit 860.

The second storage unit 810 is configured to, when the first user registers the first account, store a correspondence relationship between the first account and a first service password;

The receiving unit 820 is configured to, when the first user logs on a client device based on the first account, receive an operation request for requesting a service operation from the first user The searching unit 830 is configured to, according to the first account, search account binding relationship which has been stored;

The control unit 840 is configured to, if a second account bound with the first account is found, permit the first user to accomplish the service operation using the second account authority of the second account;

The update unit 850 is configured to update the second account information of the second account according to the operation result of the service operation;

The notification unit 860 is configured to, after the second account information of the second account is updated, send a notification message to the second user, to notify the second user of updated contents of the second account information.

In one optional implementation manner:

the control unit 840 may include (not shown in FIG. 8):

an account outputting sub-unit, configured to output the second account as an optional account on a service operation interface of the first user;

a password receiving sub-unit, configured to receive a service password input after the first user selects the second account for accomplishing the service operation; and an authority release sub-unit, configured to, when it is verified that the input service password is consistent with the first service password stored in the correspondence relationship, release the first user to accomplish the service operation using the second account authority.

In another optional implementation manner:

the receiving unit 820 may be further configured to receive a reverse operation request for the service operation sent by the first user; and the update unit 850 may be further configured to, after the reverse operation of the service operation is accomplished, update the second account information according to the operation result of the reverse operation.

Figure 9:
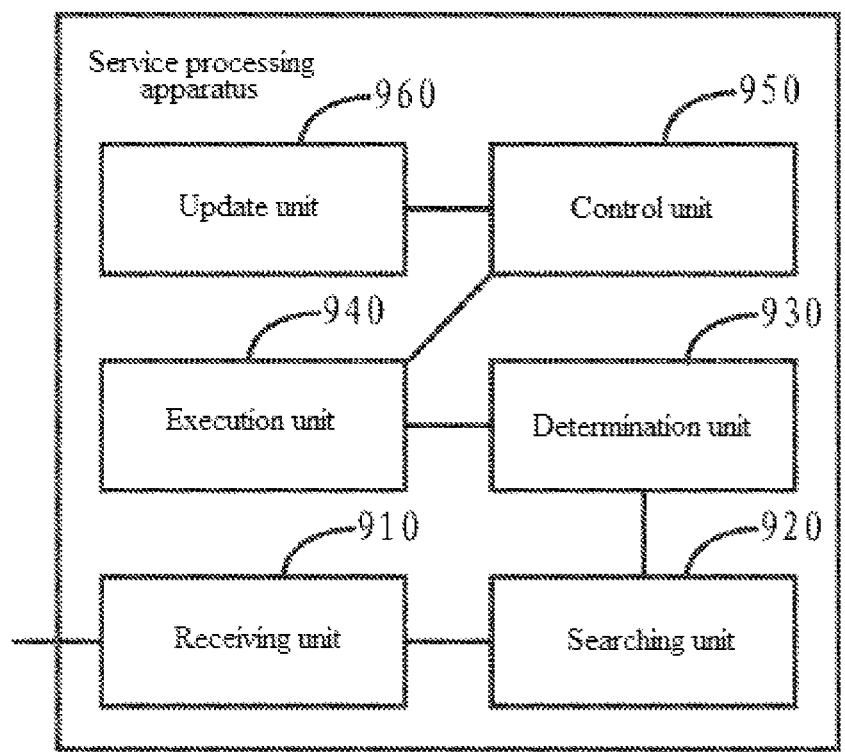
FIG. 9 is a block diagram of another embodiment of the service processing apparatus according to the present application.

Referring to FIG. 9, it is a block diagram of another embodiment of the service processing apparatus according to the present application. The apparatus includes: a receiving unit 910, a searching unit 920, a determination unit 930, an execution unit 940, a control unit 950 and an update unit 960.

The receiving unit 910 is configured to, when a first user logs on a client device based on a first account, receive an operation request for requesting a service operation from the first user;

The searching unit 920 is configured to, according to the first account, search account binding relationship which has been stored;

The determination unit 930 is configured to, if a second account bound with the first account is found, determine a security attribute of a service scenario corresponding to the service operation;

The execution unit 940 is configured to, when the security attribute is secure, trigger the control unit to execute a corresponding function; when the security attribute is insecure, prohibit the first user from accomplishing the service operation using the second account authority.

The control unit 950 is configured to, after receiving a trigger instruction from the execution unit, permit the first user to accomplish the service operation using the second account authority of the second account;

The update unit 960 is configured to update the second account information of the second account according to the operation result of the service operation.

Reference can be made to the implementation processes of the corresponding steps in the above method for implementation processes of the functions and effects of the units in the apparatus, which are not repeated herein.

The apparatus embodiment is basically corresponding to the method embodiment, and thus reference can be made to the description in the method embodiment for the related contents. The apparatus embodiment described above is merely schematic. The units described as separate parts may or may not be physically separate, and parts displayed as units may or may not be physical units, may be located in one position, or may be distributed on a plurality of network units. Some or all of the units may be selected according to actual needs to achieve the objectives of the solutions of the present application. Those of ordinary skill in the art can understand and implement the present application without making creative efforts.

It is thus clear from the above embodiments that the second user can authorize the first user having an intimate relationship with the second user to use the second account authority of the second user, such that the first user can accomplish various service operations on the basis of the account authorities of multiple bound accounts, thus expanding the way of implementing services. Moreover, as the second account information is directly updated after a service operation is accomplished, the times of transmission of service data among different accounts can be reduced, thus improving the interactive efficiency of service information.

After considering the specification and practicing the invention disclosed here, those skilled in the art can easily think of other implementation solutions of the present application. The present application is aimed to cover any variations, uses or adaptive changes of the present application, and the variations, uses or adaptive changes conform to the general principle of the present application and include the common sense or common technical means in the technical field not disclosed in the present application. The specification and the embodiments are merely considered as exemplary. The real scope and spirit of the present application are indicated by the following claims.

It should be understood that the present application is not limited to the precise structure that has been described above and illustrated in the accompanying drawings, and various modifications and changes can be made thereto without departing from the scope thereof. The scope of the present application is merely limited by the appended claims.

The invention claimed is:

1. A service processing method, the method comprising:
sending a list of recommended accounts to a second user, the list of recommended accounts including at least one account of a user whose intimate relationship with the second user has a value exceeding a preset relationship threshold;
receiving an authorization message of the second user, the authorization message including a first account selected from the list of recommended accounts by the second user;
storing a binding relationship between the first account and a second account of the second user in an account binding relationship according to the authorization message;
when a first user logs on a client device based on the first account, receiving an operation request for requesting a service operation from the first user;
according to the first account, searching account binding relationship which has been stored;
if the second account of the second user bound with the first account is found, permitting the first user to accomplish the service operation by a second account authority of the second account.

2. The method according to claim 1, wherein the authorization message further comprises: a using condition of the second account authority; and
the permitting the first user to accomplish the service operation by the second account authority of the second account is: permitting the first user, under the using condition, to accomplish the service operation by the second account authority of the second account.

3. The method according to claim 1, wherein the method further comprises:
receiving an authorization release message sent by the second user, the authorization release message including the first account; and
deleting the binding relationship between the first account and the second account from the account binding relationship according to the authorization release message.

4. The method according to claim 1, wherein the method further comprises:
when the first user registers the first account, storing a correspondence relationship between the first account and a first service password; and
the permitting the first user to accomplish the service operation by the second account authority of the second account comprises:
presenting the second account as an optional account on a service operation interface of the first user;
receiving an input service password after the first user selects the second account for the service operation; and
when it is verified that the input service password is consistent with the first service password stored in the correspondence relationship, releasing the first user to perform the service operation by the second account authority.

5. The method according to claim 1, wherein the method further comprises:
after the first user accomplishes the service operation by the second account authority, updating the second account information of the second account according to the operation result of the service operation; and
after the second account information of the second account is updated, sending a notification message to the second user to notify the second user of updated contents of the second account information.

6. The method according to claim 1, wherein the method further comprises:
receiving a reverse operation request for the service operation sent by the first user; and
after the reverse operation of the service operation is accomplished, updating the second account information according to the operation result of the reverse operation.

7. A service processing method, the method comprising:
when a first user logs on a client device based on a first account, receiving an operation request for requesting a service operation from the first user;
according to the first account, searching account binding relationship which has been stored;
in response to that a second account bound with the first account is found, determining a security attribute of a service scenario corresponding to the service operation;
when the security attribute is secure, permitting the first user to perform the service operation by a second account authority of the second account; when the security attribute is insecure, prohibiting the first user from performing the service operation by the second account authority of the second account.

8. A service processing apparatus, the apparatus comprising:
one or more processors; and
one or more computer-readable memories coupled to the one or more processors and having instructions stored thereon that are executable by the one or more processors to cause the apparatus to:
send a list of recommended accounts to a second user, the list of recommended accounts including at least one account of a user whose intimate relationship with the second user has a value exceeding a preset relationship threshold;
receive an authorization message of the second user, the authorization message including a first account selected from the list of recommended accounts by the second user;
store a binding relationship between the first account and the second account of the second user in the account binding relationship according to the authorization message;
when a first user logs on a client device based on the first account, receive an operation request for requesting a service operation from the first user;
according to the first account, search account binding relationship which has been stored;
if the second account of the second user bound with the first account is found, permit the first user to accomplish the service operation by a second account authority of the second account.

9. The apparatus according to claim 8, wherein the authorization message further comprises a using condition of the second account authority; and
wherein the one or more computer-readable memories further store instructions that are executable by the one or more processors to cause the apparatus to: permit the first user, under the using condition, to accomplish the service operation by the second account authority of the second account.

10. The apparatus according to claim 8, wherein the one or more computer-readable memories further store instructions that are executable by the one or more processors to cause the apparatus to:
receive an authorization release message sent by the second user, the authorization release message including the first account; and
delete the binding relationship between the first account and the second account from the account binding relationship according to the authorization release message.

11. The apparatus according to claim 8, wherein the one or more computer-readable memories further store instructions that are executable by the one or more processors to cause the apparatus to:
when the first user registers the first account, store a correspondence relationship between the first account and a first service password; and
output the second account as an optional account on a service operation interface of the first user;
receive an input service password after the first user selects the second account for the service operation; and
when it is verified that the input service password is consistent with the first service password stored in the correspondence relationship, release the first user to perform the service operation by the second account authority.

12. The apparatus according to claim 8, wherein the one or more computer-readable memories further store instructions that are executable by the one or more processors to cause the apparatus to:
after the first user accomplishes the service operation by the second account authority, update the second account information of the second account according to the operation result of the service operation; and
after the second account information of the second account is updated, send a notification message to the second user, to notify the second user of updated contents of the second account information.

13. The apparatus according to claim 12, wherein the one or more computer-readable memories further store instructions that are executable by the one or more processors to cause the apparatus to:

receive a reverse operation request for the service operation sent by the first user; and after the reverse operation of the service operation is accomplished, update the second account information according to the operation result of the reverse operation.

14. A non-transitory computer readable storage medium configured with instructions executable by one or more processors to cause the one or more processors to:

when a first user logs on a client device based on a first account, receive an operation request for requesting a service operation from the first user;

according to the first account, search account binding relationship which has been stored;

in response to that a second account bound with the first account is found, determine a security attribute of a service scenario corresponding to the service operation;

when the security attribute is secure, trigger the control unit to permit the first user to perform the service operation by a second account authority of a second account; when the security attribute is insecure, prohibit the first user from performing the service operation by the second account authority of the second account.

15. A server, comprising:

a processor; and a memory configured to store executable instructions of the processor;

wherein the processor is configured to:

when a first user logs on a client device based on a first account, receive an operation request for requesting a service operation from the first user;

according to the first account, search account binding relationship which has been stored;

if a second account of a second user bound with the first account is found, determine a security attribute of a service scenario corresponding to the service operation;

when the security attribute is secure, trigger the control unit to permit the first user to perform the service operation by a second account authority of the second account; when the security attribute is insecure, prohibit the first user from performing the service operation by the second account authority of the second account; and after the first user accomplishes the service operation by the second account authority, update the second account information of the second account according to the operation result of the service operation.

* * * * *